E. C. DENIO & G. K. BABCOCK.

Spading and other Forks.

No. 6,266. Reissued Feb. 2, 1875.

WITNESSES

P. C. Dutend

H. C. McArthur

INVENTOR

Elon C. Denio,

Geo. K. Babcock

Per C. H. Watson & Co

ATTORNEYS

THE GRAPHIC CO. PHOTO-LITH. 39 & 41 PARK PLACE, N.Y.

UNITED STATES PATENT OFFICE.

ELON C. DENIO AND GEORGE K. BABCOCK, OF NEW HARTFORD, NEW YORK.

IMPROVEMENT IN SPADING AND OTHER FORKS.

Specification forming part of Letters Patent No. 92,709, dated July 20, 1869; reissue No. 6,266, dated February 2, 1875; application filed January 12, 1875.

*To all whom it may concern:*

Be it known that we, ELON C. DENIO and GEORGE K. BABCOCK, of New Hartford, in the county of Oneida and State of New York, have invented certain new and useful Improvements in Spading and other Forks; and we do hereby declare that the following is a full, clear, and exact description thereof, that will enable others skilled in the art to which it appertains to make and use the same, reference being had to the accompanying drawings and to the letters of reference marked thereon, which form a part of this specification.

The object of our invention is to increase the strength of the fork or hook, at or near where the tang or shank is joined to the head of the implement, by a device to resist the bending or breaking at that (the weakest) part of the tool; and the nature of our invention consists in providing the ferrule placed upon the end of the handle with a supplemental ferrule or strengthening-ring around its outer end; also in a raised projection upon the back or resisting part of a fork or hook; and in the combination of parts, as will be hereinafter more fully set forth.

Figure 1:
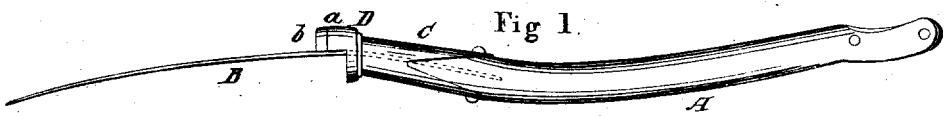
Figure 2:
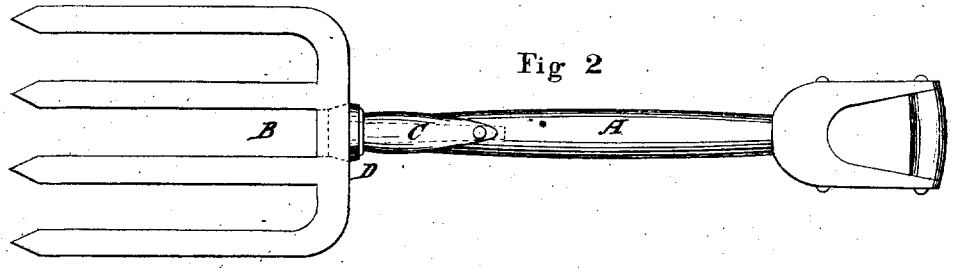
Figure 3:
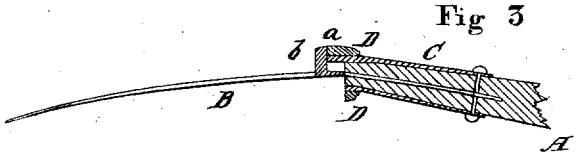

Figure 1 is a side view of a common spading-fork embodying our invention. Fig. 2 is a plan view of the same. Fig. 3 is a longitudinal section through a part of the handle and fork.

A represents the handle, and B the fork. The end of the handle A is surrounded with an ordinary ferrule, C, and the outer end of the ferrule is provided with a surrounding supplemental ferrule or strengthening-ring, D, to give additional strength at the point where most needed. The supplemental ferrule or ring D is shown formed with a projection, *a*, which passes beyond the edge and corner of the fork-head on the back part, to support the fork at the junction of the tang and head. On the head of the fork B is a raised projection, *b*, which bears against the projection *a* of the ferrule D; or if this latter projection is not used, the fork-head projection *b* will bear against the end of the handle and ferrules, thereby resisting the liability to break by tension on the tang or shank.

The same invention, it is evident, may be applied to other tools secured to a wooden handle.

Having thus fully described our invention, what we claim as new, and desire to secure by Letters Patent, is—

1. The handle A and tool B, in combination with the ferrule C, extending entirely around the handle, and the supplemental ferrule D, substantially as and for the purpose set forth.

2. The raised projection upon the back or resisting part of a fork or other tool, substantially as and for the purpose specified.

3. The combination of the handle A, ferrule C, supplemental ferrule D, with projection *a*, and the tool-head with projection *b*, all substantially as and for the purposes herein set forth.

In testimony that we claim the foregoing we have hereunto set our hands this 7th day of January, 1875.

ELON C. DENIO.
GEO. K. BABCOCK.

Witnesses:
J. BRINKERHOFF,
A. VAN VALKENBURG.